March 9, 1965 — J. J. PRIZZIA, JR — 3,172,207
GEOMETRIC INSTRUMENTS
Filed Aug. 1, 1960
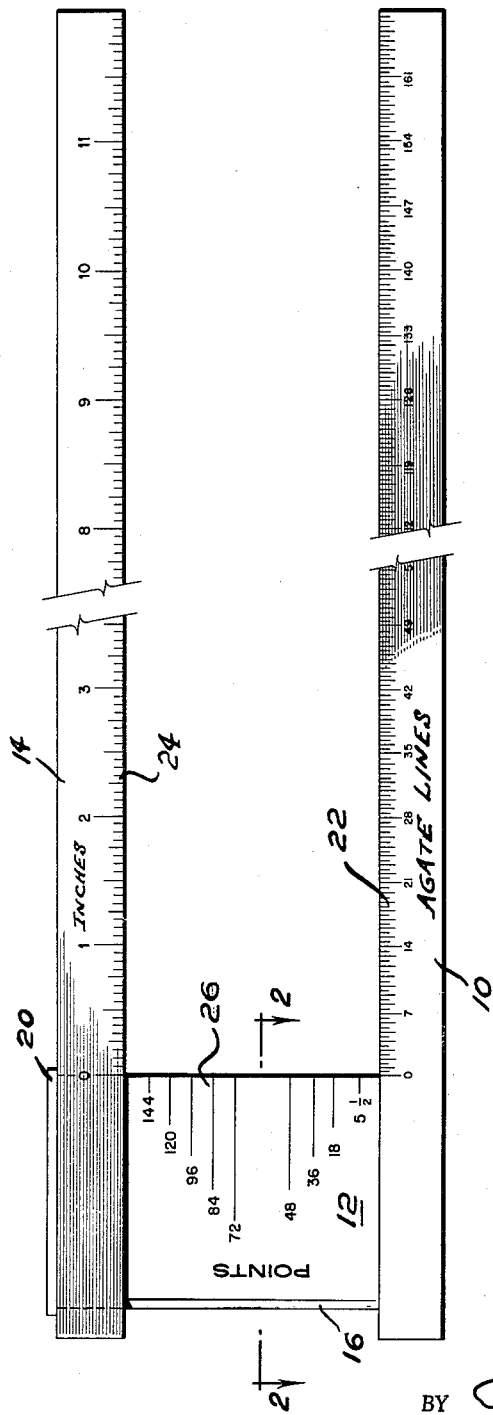
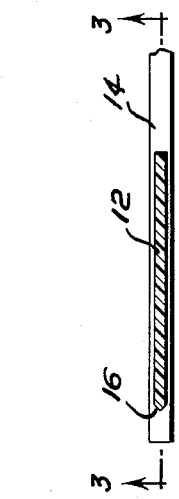
JOHN J. PRIZZIA, JR.
INVENTOR
BY Pattison, Wright and Pattison
ATTORNEYS

United States Patent Office 3,172,207
Patented Mar. 9, 1965

3,172,207
GEOMETRIC INSTRUMENTS
John J. Prizzia, Jr., Box 127, Marlboro, N.Y.
Filed Aug. 1, 1960, Ser. No. 46,543
1 Claim. (Cl. 33—95)

This invention relates to geometric instruments and more particularly and specifically to new and useful improvements in instruments for laying out advertising and other printed material.

Heretofore, certain devices have been provided for laying out advertising matter and other data for printing purposes. Some of these prior devices have been simple, straight line rules and gauges incorporating one or more scales for successively measuring or determining type point size or agate line per inch dimensions. Still other complex and intricate instruments have been provided for laying out printed matter which devices have been large, cumbersome and costly.

The present invention serves to provide a unique geometrical device which enables the quick and ready computation and scribing of layout guides for printing purposes, yet a device which is simple and inexpensive in construction and which is of extremely simple operation.

It is a general object of this invention to provide a new and useful layout ruler which combines the attributes of simplicity and low cost with the functional attributes of complex and costly instruments.

Another object of this invention lies in the provision of a new and useful layout ruler which is small, compact and easily handled by a layout draftsman to facilitate the ruling of guide lines for type and other printed material with simultaneous correlation between cooperative reference scales designating agate lines per inch, lineal inches and type point height.

A further object of this invention is the provision of a novel and useful instrument of the type and for the purpose described which provides for the interrelated and cooperative function of three separate and distinct scales simultaneously while at the same time establishing ruling edges along which layout guide lines are scribed in relationship one to the other as determined by the cooperative function of the several scales.

Still further objects and advantages of the present invention will become more readily apparent to one skilled in the art when the following descriptions are read in the light of the accompanying drawings.

The nature of the present invention may be described in general terms as relating to a layout ruler for printers, engravers and draftsmen which consists of a flat, L-shaped rule stick having an agate line scale longitudinally of the base leg thereof and a type point scale longitudinally of the vertical leg thereof, an elongated flat scribing rule disposed in parallel with the base leg of the L-shaped rule with one end slidably engaged over the vertical leg of the L-shaped rule, said flat scribing rule having an indicator edge movable along the type point scale on the vertical leg of the L-shaped rule toward and away from the base leg thereof.

Referring now to the accompanying drawings in which like numerals designate similar parts throughout the several views:

FIG. 1 is an elevational view of the novel layout device constituting the present invention.

FIG. 2 is a horizontal sectional view taken on line 2—2, FIG. 1.

FIG. 3 is a vertical sectional view taken on line 3—3, FIG. 2.

The layout rule constituting the present invention, as shown by way of illustrative embodiment in the accompanying drawings, consists of three scaled rule sticks 10, 12 and 14 made of semi-rigid, flat stock such as, for example, plastic or plasticized fiberboard. Rules 10 and 14 are substantially identical in form and configuration, while rule 12 is shorter in length and broader in transverse dimension than are rules 10 and 14.

In construction rules 10 and 12 are integrally formed into an L-shaped ruler with rule element 12 projecting perpendicularly from one end of rule element 10. That longitudinal edge of rule element 12 disposed in the same direction as the adjacent end of rule element 10 is beveled, as at 16, from each face thereof to provide a V-shaped edge or key therealong.

Rule 14 is provided adjacent to and inwardly of one end thereof with a vertically formed slot 18 having a V-grooved side wall toward the adjacent end of the rule, and the slot 18 being otherwise shaped and dimensioned to telescopically, slidably receive the upper free end of rule component 12 therethrough in keyed engagement therewith. When rule 14 has been slidably positioned on rule element 12 an end cap 20 is secured on the free end of rule 12 to form a stop for vertical movement of rule 14 thereon.

In operation or use, the layout rule is used for setting up and laying out guide lines for printed and like indicia with the inside or opposed edges of rule elements 10 and 14 forming straight edges for scribing layout guide lines. By moving rule component 14 vertically along rule component 12 the lower inner edge of rule 14, where it overlies the face of rule component 12, serves in its coincidence with the scale indicia on rule component 12 to designate a given type point on that scale which is measured between the opposed edges of the rule components 10 and 14. Thus, horizontal guide lines may be drawn or scribed along these edges of components 10 and 14 to establish the vertical height of the particular type desired. At the same time, reference may be made to scale 22 on rule component 10 to determine the appropriate agate line dimensioning for the selected type so that such dimensioning may be scribed off along the bottom guide line drawn along the face of rule component 10.

It may thus be seen that in a single operational step the layout ruler functions to determine type point height and agate line dimensioning, while simultaneously forming the scribing lines to layout both such dimensions on the underlay sheet upon which the layout rule is superimposed. At the same time, the layout ruler hereinbefore disclosed may be quickly and readily used to compute within a given space or area to which it is applied the size or point of type which must be used in order to print within that area a given amount of material.

From the foregoing it is readily seen that a novel and useful geometric device has been provided which has substantial functional advantage and utility and one which attains all of the objects and advantages hereinbefore set forth.

Having thus described and explained my invention, what I desire to claim is:

A printer's gauge and layout instrument comprising, an elongated flat rule having an agate line per inch scale extending along one edge thereof from a zero reference spaced from an adjacent end thereof, a second flat rule formed integrally with said first-named rule between the zero reference thereon and the adjacent end thereof, said second rule projecting perpendicularly from said first-named rule, a type point scale provided along one edge of said second rule from a zero reference coinciding with the zero reference on said first rule scale, said second flat rule having a projecting key formed longitudinally of one edge thereof, an elongated flat bar having a channel formed transversely therethrough adjacent one end thereof, said flat bar having a keyway formed therein longitudinally of and in communication with said channel therein, said flat bar channel and keyway slidably and telescopically receiving said second rule and key positioning said flat bar in perpendicular extension from said second rule and in adjustably spaced parallel relationship to said first-named rule, and an inch scale provided along that longitudinal edge of said flat bar disposed toward said first-named rule from a zero reference thereon coinciding with that longitudinal edge of said second rule along which said type point scale is provided.

References Cited by the Examiner
UNITED STATES PATENTS

| | | | |
|---|---|---|---|
| 59,721 | 11/66 | Kellogg | 33—95 |
| 204,601 | 6/78 | Perris | 33—111 |
| 612,690 | 10/98 | White | 33—95 |
| 1,330,353 | 2/20 | Smith | 33—76 |
| 1,509,703 | 9/24 | Bourgeois | 33—95 |
| 1,695,423 | 12/28 | Gyllenberg | 33—1 XR |
| 2,100,114 | 11/37 | Walsh | 33—184.5 |
| 2,252,535 | 8/41 | West et al. | 33—184.5 |

FOREIGN PATENTS 454,920  1/28  Germany.

ISAAC LISANN, *Primary Examiner.*
L. R. PRINCE, ROBERT EVANS, *Examiners.*